(12) United States Patent
Zhou

(10) Patent No.: US 11,415,727 B2
(45) Date of Patent: Aug. 16, 2022

(54) CAMERA PROTECTION DEVICE AND MOBILE PHONE PROTECTION JACKET HAVING ANNULAR LIGHT SHIELDING LAYER

(71) Applicant: Guangzhou SunRuo Technology Development Co., Ltd, Guangzhou (CN)

(72) Inventor: Rubiao Zhou, Guangzhou (CN)

(73) Assignee: Guangzhou Sunruo Technology Development, Co., Ltd., Guangzhou (CN)

( * ) Notice: Subject to any disclaimer, the term of this patent is extended or adjusted under 35 U.S.C. 154(b) by 355 days.

(21) Appl. No.: 16/720,313

(22) Filed: Dec. 19, 2019

(65) Prior Publication Data

US 2021/0132258 A1 May 6, 2021

(30) Foreign Application Priority Data

Nov. 1, 2019 (CN) .......................... 201921877900.9

(51) Int. Cl.
| | |
|---|---|
| G02B 1/14 | (2015.01) |
| G02B 7/02 | (2021.01) |
| G03B 17/56 | (2021.01) |
| H04M 1/03 | (2006.01) |
| H04N 5/225 | (2006.01) |
| G03B 11/04 | (2021.01) |
| H04M 1/04 | (2006.01) |
| G03B 17/02 | (2021.01) |
| H04M 1/02 | (2006.01) |

(Continued)

(52) U.S. Cl.
CPC .............. G02B 1/14 (2015.01); G02B 7/021 (2013.01); G03B 11/045 (2013.01); G03B 17/02 (2013.01); G03B 17/56 (2013.01); G03B 17/565 (2013.01); H04M 1/02 (2013.01); H04M 1/04 (2013.01); H04M 1/62 (2013.01); H04N 5/2254 (2013.01); H04M 1/185 (2013.01)

(58) Field of Classification Search
CPC . G02B 1/14; G02B 1/18; G02B 7/021; G02B 27/0006; G02B 27/0018; G03B 11/045; G03B 17/56; G03B 17/565; G03B 17/566; G03B 2217/002; H01M 1/0264; H01M 1/185; H04N 5/22521; H04N 5/2254
See application file for complete search history.

(56) References Cited

U.S. PATENT DOCUMENTS

| | | | |
|---|---|---|---|
| 2020/0064681 A1* | 2/2020 | Son | G02F 1/133308 |
| 2020/0310489 A1* | 10/2020 | Spraggs | G06F 1/1615 |
| 2021/0136187 A1* | 5/2021 | Jeon | H04M 1/0264 |

* cited by examiner

*Primary Examiner* — Ryan S Dunning
(74) *Attorney, Agent, or Firm* — Trevor T. Graves; Stites & Harbison, PLLC

(57) ABSTRACT

Disclosed are a camera protection device and a mobile phone protection jacket. The camera protection device includes: a first sheet body having a first hole structure configured for cooperation with a camera of a mobile phone and a second hole structure configured for cooperation with a flash lamp of the mobile phone, and a light shielding structure formed integrally or separately with the first sheet body, the light shielding structure being arranged between the flash lamp and a lens protection film of the camera. The mobile phone protection jacket is provided with the camera protection device according to any implementation in the first aspect.

15 Claims, 4 Drawing Sheets

(51) Int. Cl.
*H04M 1/62* (2006.01)
*H04M 1/18* (2006.01)

CAMERA PROTECTION DEVICE AND MOBILE PHONE PROTECTION JACKET HAVING ANNULAR LIGHT SHIELDING LAYER

The disclosure of Chinese Patent Application 201921877900.9, filed Nov. 1, 2019, is incorporated herein by reference.

FIELD

The disclosure relates to the field of accessories for mobile phones, and in particular to a camera protection device and a mobile phone protection jacket.

BACKGROUND

To prevent a lens on a camera of a mobile phone from being scratched and thus affecting the quality of pictures shot, it is generally necessary to attach a lens protection film on the lens of the camera of the mobile phone. After attachment of the lens protection film, when the mobile phone shoot images, particularly night-scene images, it is likely that the images shot are whitened and fuzzy, influencing the imaging quality.

SUMMARY

In order to solve at least one of the technical problems in the prior art, an objective of the disclosure is to provide a camera protection device and a mobile phone protection jacket, which can effectively prevent a camera of a mobile phone from damage when in use and can also avoid the interference between a flash lamp of the mobile phone and a lens protection film which affects the imaging quality.

To solve the technical problem, the disclosure employs the following technical solutions.

In a first aspect, a camera protection device is provided, including:
  a first sheet body, having:
    a first hole structure configured for cooperation with a camera of a mobile phone;
    a second hole structure configured for cooperation with a flash lamp of the mobile phone; and
    a light shielding structure which is formed integrally or separately with the first sheet body, the light shielding structure being arranged between the flash lamp and a lens protection film of the camera.

In some embodiments, the first sheet body is made of light transmitting material.

In some embodiments, the light shielding structure includes a first light shielding layer arranged on a wall of the first hole structure and/or the second hole structure.

In some embodiments, the light shielding structure includes a first light shielding ring embedded into the first hole structure and/or the second hole structure.

In some embodiments, both the first hole structure and the second hole structure are a through hole or blind hole.

In some embodiments, the sheet is made of glass or polymethyl methacrylate (PMMA).

In some embodiments, a third hole structure configured for cooperation with a noise-reducing microphone is arranged on the first sheet body.

In some embodiments, the camera protection device further includes a second sheet body covered outside the first sheet body and made of light transmitting material, wherein the second sheet body includes a fourth hole structure arranged at a position of the second sheet body corresponding to the second hole structure, a second light shielding layer and/or a second light shielding ring arranged on an inner side of a wall of the fourth hole structure, a third annular light shielding layer arranged on a surface of the second sheet body at a position corresponding to the first hole structure, and a fifth hole structure arranged at a position of the second sheet body corresponding to the third hole structure.

In a second aspect, a mobile phone protection jacket is provided, on which the camera protection device according to any implementation of the first aspect is arranged.

In some embodiments, the mobile phone protection jacket is formed with a profiled mounting hole into which the camera protection device is embedded.

The technical solutions described above have at least one of the following advantages or beneficial effects. Firstly, the camera protection device can be arranged on an outer side of the camera of the mobile phone to protect the camera of the mobile phone, particularly the camera which is bumped, so that the camera of the mobile phone is effectively protected from damage when in use. Meanwhile, since the camera protection device has a light shielding structure, light from the flash lamp can be prevented from entering a lens through an edge of the lens protection film by the light shielding structure, so that the interference between the flash lamp of the mobile phone and the lens protection film which affects the imaging quality can be avoided.

BRIEF DESCRIPTION OF THE DRAWINGS

The disclosure will be further described below with reference to the accompanying drawings, in which.

DETAILED DESCRIPTION OF THE EMBODIMENTS

Specific embodiments of the disclosure will be described in detail in this section, and the preferred embodiments of the disclosure are shown in the accompanying drawings. The accompanying drawings are used for supplementing the written description in a graphic manner so that each technical feature and the overall technical solutions of the disclosure can be understood intuitively and visually, but they shall not regarded as limiting the protection scope of the disclosure.

In the disclosure, if a direction (upper, lower, left, right, front and rear) is described, this direction is merely for conveniently describing the technical solution of the disclosure, rather than indicating or implying that the involved technical solution must have a particular orientation or be constructed and operated in a particular orientation, thus it shall not be regarded as limiting the disclosure.

In the disclosure, the term "several" means one or more, the term "a plurality of" means more than two, the terms such as "greater than", "less than" or "more than" shall be regarded as excluding the involved number, and the terms such as "above", "below" or "within" shall be regarded as including the involved number. In the description of the disclosure, if described, the terms such as "first" and "second" are merely for distinguishing the technical features, rather than implying or indicating relative importance or implicitly indicating the number of the involved technical features or the precedence relationship between the involved technical features.

In the disclosure, unless otherwise expressly defined, the terms "arranged", "mounted", "connected" and the like shall be interpreted in a broad sense. For example, it may be directly connected, or indirectly connected via an intermediate medium; it may be fixedly connected, or may be detachably connected or formed integrally; it may be mechanically connected or electrically connected, or may be communicated with each other; it may be an internal communication of two elements or an interaction relationship of two elements. The specific meanings of the above terms in the disclosure can be rationally determined in combination with the specific contents of the technical solutions by those skilled in the art.

The inventor of the technical solutions has found that, since a flash lamp and a camera of a mobile phone are arranged in a same region of the mobile phone and the attached lens protection film is bumped relative to the surface of the camera, light from the flash lamp, when activated, will enter the camera through the edge of the lens protection film, resulting in that the shot images are whitened and fuzzy and the imaging quality is affected.

Figure 1:
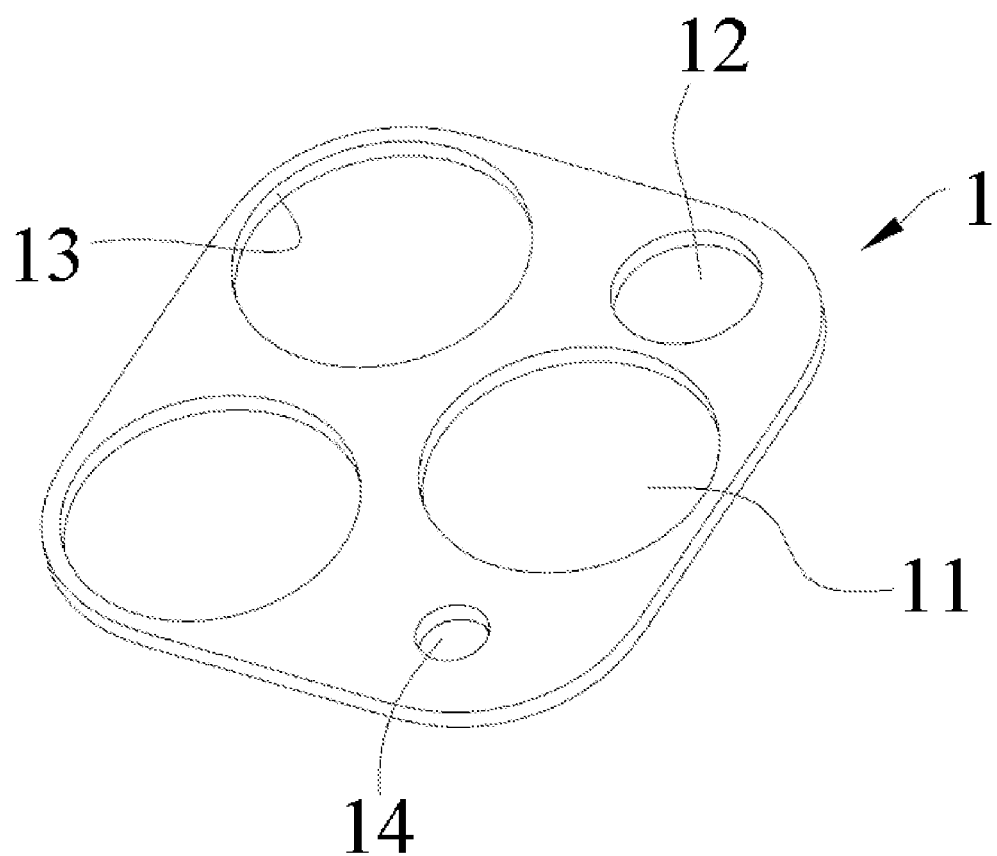
FIG. 1 is a schematic structural view of an embodiment of the camera protection device according to the disclosure.
Figure 2:
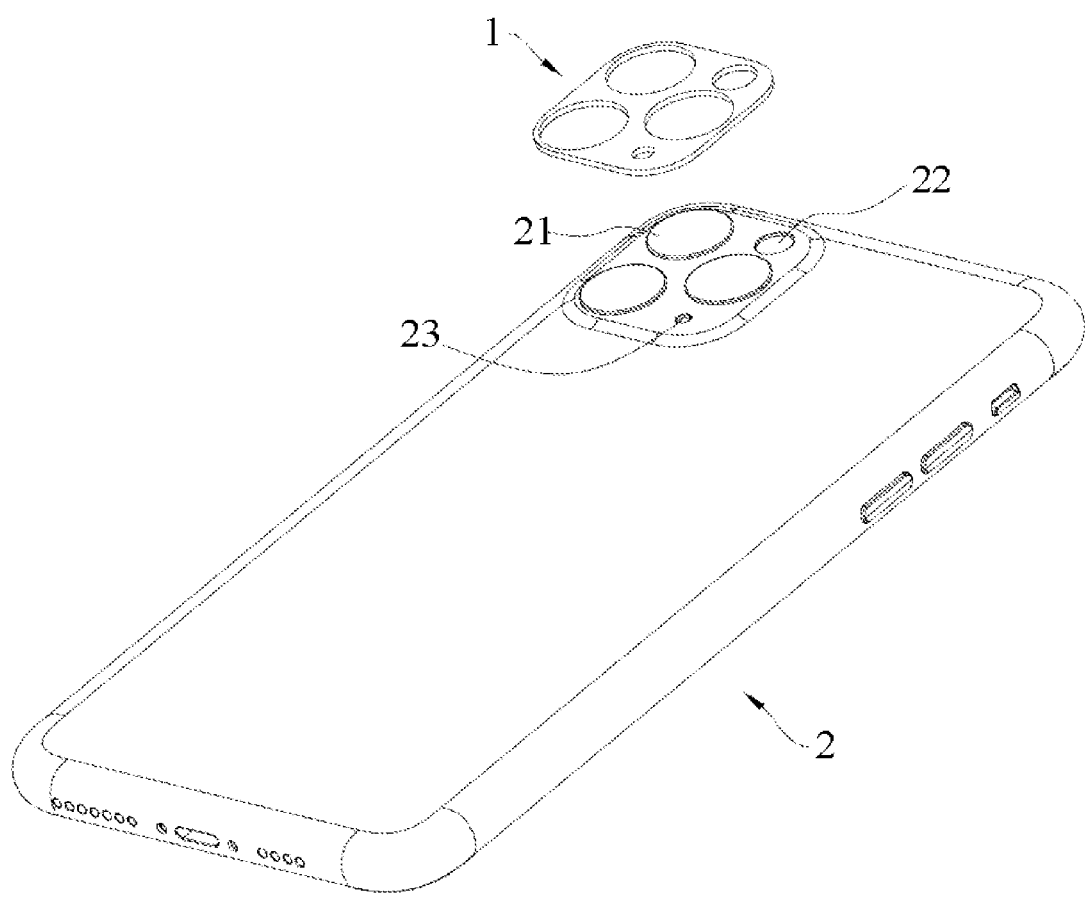
FIG. 2 is a schematic view of fitting of the camera protection device shown in FIG. 1 with a mobile phone.

In view of this, referring to FIG. 1, in an embodiment of the disclosure there is provided a camera protection device, including a first sheet body 1 and a light shielding structure or shield. A first hole structure 11 and a second hole structure 12 are arranged in the first sheet body 1. One or more first hole structures 11 and one or more second hole structures 12 may be arranged depending on the configuration of the mobile phone. For example, in the embodiment shown in FIG. 1, there are three first hole structures 11 and one second hole structure 12. The first hole structure 11 is configured for cooperation with a camera 21 of a mobile phone 2. For example, in the embodiment shown in FIG. 2, the camera 21 of the mobile phone 2 is bumped relative to the surface of the mobile phone 2, and profile modeling design is used for the first hole structure 11 and the lens body. After the first sheet body 1 is attached to the mobile phone 2, the first hole structure 11 of the first sheet body 1 is sleeved on the camera 21 to protect the camera 21, thus effectively protecting the camera 21 of the mobile phone 2 from damage when in use.

The second hole structure 12 is configured for cooperation with a flash lamp 22 of the mobile phone 2, so that light from the flash lamp 22 can be irradiated outwards more smoothly.

The light shielding structure is formed integrally or separately with the first sheet body 1. The light shielding structure is arranged between the flash lamp 22 and a lens protection film of the camera 21, so that light from the flash lamp 22 can be prevented by the light shielding structure from entering the camera 21 through the edge of the lens protection film, and the interference between the flash lamp 22 of the mobile phone 2 and the lens protection film can be avoided from affecting the imaging quality.

In some embodiments, the first sheet body 1 is made of light transmitting material, for example, but not limited to glass or polymethyl methacrylate (PMMA). The light transmitting material enables the surface design of the mobile phone 22 to emerge and improve the texture of the product. Both the first hole structure 11 and the second hole structure 12 may be a through hole which facilitates a high permeability, or a blind hole which has an excellent integrality and durability due to that the camera 21 and the flash lamp 22 can be protected directly by the first sheet body 1.

The light shielding structure is configured to block the transmission of light from the flash lamp 22 to the end face of the edge of the protection film of the camera 21. The light shielding structure may be integrally or separately with the first sheet body 1. For example, in some embodiments, the light shielding structure includes a first light shielding layer 13 arranged on a wall of the first hole structure 11 and/or the second hole structure 12. The first light shielding layer 13 is attached to the wall of the first hole structure 11 and/or the second hole structure 12 in a manner such as coating or spraying. The first light shielding layer 13 is arranged between the flash lamp 22 and the lens protection film of the camera 21, so that light from the flash lamp 22 can be prevented by the light shielding structure from entering the camera 21 through the edge of the lens protection film, and the interference between the flash lamp 22 of the mobile phone 2 and the lens protection film which affects the imaging quality can be avoided. The first light shielding layer 13 is easier to form, has better integrality with the first sheet body 1, and has better light shielding effect.

In other embodiments, the light shielding structure incudes a light shielding ring. The light shielding ring is formed separately with the first sheet body 1, and embedded into the first hole structure 11 and/or the second hole structure 12. The light shielding ring is arranged between the flash lamp 22 and a lens protection film of the camera 21, so that light from the flash lamp 22 can be prevented by the light shielding structure from entering the camera 21 through the edge of the lens protection film, and the interference between the flash lamp 22 of the mobile phone 2 and the lens protection film which affects the imaging quality can be avoided. The shape and size of the first light shielding ring can be flexibly selected according to actual needs, so that the product has higher applicability.

In some embodiments, the first sheet body 1 is made of lightproof material, and both the first hole structure 11 and the second hole structure 12 are a through hole. The first sheet body 1 directly blocks the transmission of light from the flash lamp 11 to the protection film of the camera 21 through the body material, and the interference between the flash lamp 22 of the mobile phone 2 and the lens protection film which affects the imaging quality can be avoided. This embodiment is simpler in structure and better in light shielding effect.

For a mobile phone 2 equipped with a noise-reducing microphone, in some embodiments, a third hole structure 14 configured for cooperation with the noise-reducing microphone 23 of the mobile phone 2 is arranged on the first sheet body 1. By arranging the third hole structure 14, the first sheet body 1 is prevented from shielding the noise-reducing microphone 23.

Figure 3:
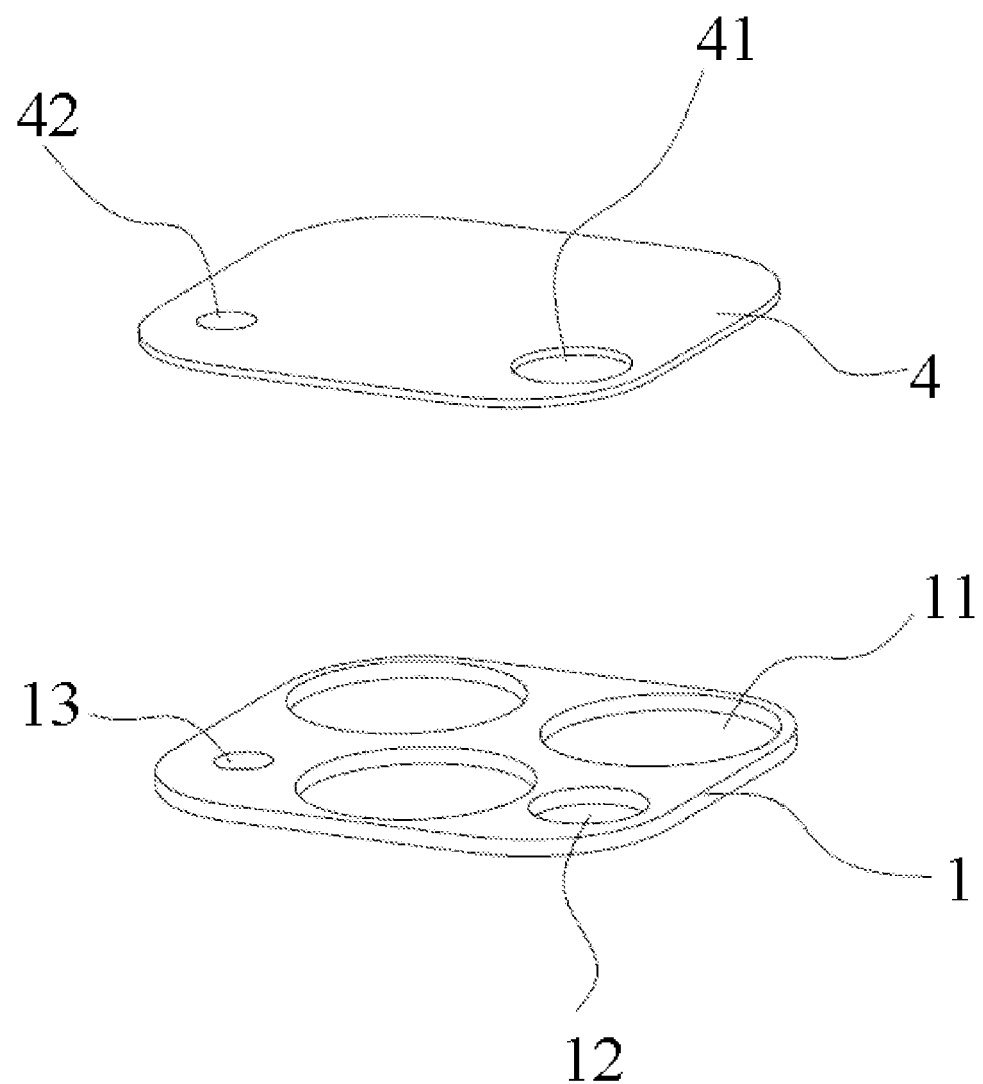
FIG. 3 is a schematic structural view of another embodiment of the camera protection device according to the disclosure.

In some embodiments, referring to FIG. 3, the camera protection device further includes a second sheet body 4. The second sheet body 4 is covered outside the first sheet body 1 and attached to the first sheet body 1. The second sheet body 4 is configured for shielding the first hole structure 11 and preventing water, dust or the like from entering the first hole structure 11 to keep the first hole structure 11 clean. The second sheet body 4 is made of light transmitting material, for example, but not limited to glass or polymethyl methacrylate (PMMA). A fourth hole structure 41 is arranged on the second sheet body 4 at a position corresponding to the second hole structure 12. The fourth hole structure 41 is butted with the second hole structure 12 to ensure that light from the flash lamp 22 can be emitted smoothly. Meanwhile, a second light shielding layer and/or a second light shielding ring is arranged on an inner side of a wall of the fourth hole structure 41. A third annular light shielding layer is arranged on the surface of the second sheet body 4 at a position corresponding to the first hole structure 11. The second light shielding layer, the second light shielding ring and the third light shielding layer are configured to prevent light from the flash lamp from entering the second sheet body 4 through the wall of the fourth hole structure 41 and thus affecting the imaging quality of the camera 21. In addition, a fifth hole structure 42 is arranged on the second sheet body 4 at a position corresponding to the third hole structure. The fifth hole structure 42 is butted with the third hole structure 14 to prevent the first sheet body 1 and the second sheet body 2 from shielding the noise-reducing microphone 23.

Figure 4:
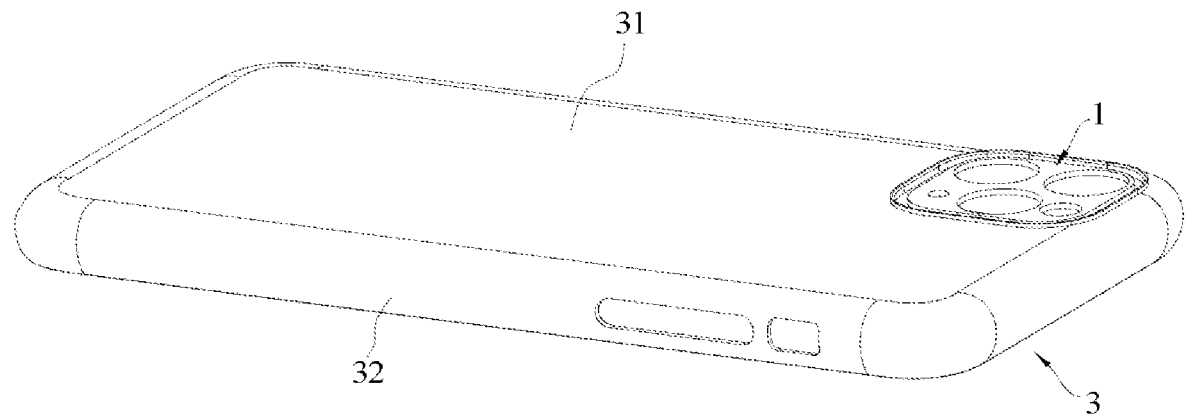
FIG. 4 is a schematic structural view of an embodiment of the mobile phone protection jacket according to the disclosure.
Figure 5:
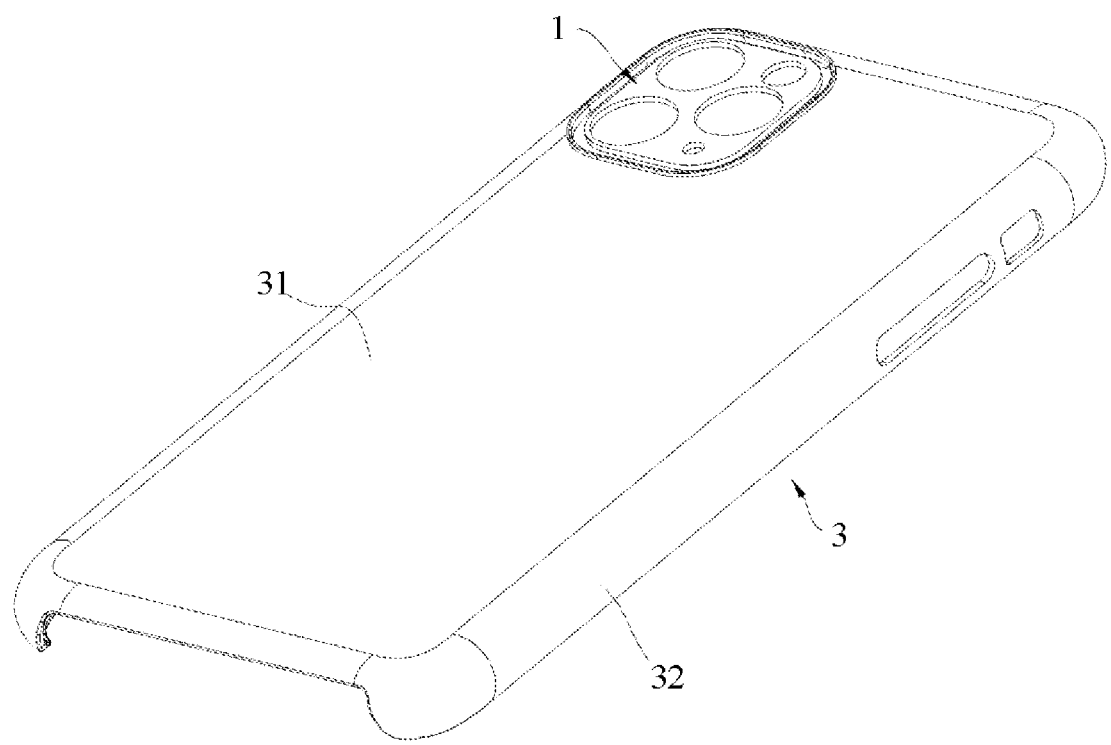
FIG. 5 is a schematic structural view of another embodiment of the mobile phone protection jacket according to the disclosure.

In an embodiment of the disclosure, there is further provided a mobile phone protection jacket 3. In the embodiments shown in FIGS. 4 and 5, the mobile phone protection jacket 3 has a rear protection region 31 and an edge protection region 32. The edge protection region 32 is a continuous or discontinuous curled rim. The camera 21 protection device according to any one of the above embodiments is arranged in the rear protection region 31 of the mobile phone protection jacket 3. The structural characteristics and advantages of the camera 21 protection device have been described above and will not be repeated here.

The mobile phone protection jacket 3 and the camera 21 protection device are formed integrally or separately. For example, in some embodiments, a profiled mounting hole is formed in the mobile phone protection jacket 3, and the camera 21 protection device is embedded into the profile mounting hole and connected to the mobile phone protection jacket 3.

Of course, the disclosure is not limited to the implementations described above. Those skilled in the art can make equivalent variations or replacements without departing from the principle of the disclosure, and these equivalent variations or replacements shall fall into the scope defined by the claims of the present application.

The invention claimed is:

1. A camera protection device, comprising:
   a first sheet body, having:
   a first hole structure configured for cooperation with a camera of a mobile phone; and
   a second hole structure configured for cooperation with a flash lamp of the mobile phone;
   a light shield, which is formed integrally or separately with the first sheet body, the light shield being arranged between the flash lamp and a lens protection film of the camera; and
   a second sheet body covering the first sheet body and made of light transmitting material, said second sheet body having:
   a third hole structure arranged at a position of the second sheet body corresponding to the second hole structure,
   a light shielding layer and/or a light shielding ring arranged on an inner side of a wall of the third hole structure,
   a second light shielding layer which is an annular light shielding layer, said second light shielding layer arranged on a surface of the second sheet body at a position corresponding to the first hole structure.

2. The camera protection device according to claim 1, wherein the first sheet body is made of lightproof material, and both the first hole structure and the second hole structure are a through hole.

3. The camera protection device according to claim 1, wherein a fourth hole structure configured for cooperation with a noise-reducing microphone is arranged on the first sheet body and a fifth hole structure arranged at a position of the second sheet body corresponding to the fourth hole structure.

4. The camera protection device according to claim 1, wherein the first sheet body is made of light transmitting material.

5. The camera protection device according to claim 4, wherein the light shield comprises a third light shielding layer arranged on a wall of the first hole structure and/or the second hole structure.

6. The camera protection device according to claim 4, wherein the light shield comprises a third light shielding ring embedded into the first hole structure and/or the second hole structure.

7. The camera protection device according to claim 4, wherein the first sheet body is made of glass or polymethyl methacrylate (PMMA).

8. A mobile phone protection jacket provided with a camera protection device comprising:
   a first sheet body, having:
   a first hole structure configured for cooperation with a camera of a mobile phone; and
   a second hole structure configured for cooperation with a flash lamp of the mobile phone;
   a light shield, which is formed integrally or separately with the first sheet body, the light shield being arranged between the flash lamp and a lens protection film of the camera; and
   a second sheet body covering the first sheet body and made of light transmitting material, said second sheet body having:
   a third hole structure arranged at a position of the second sheet body corresponding to the second hole structure,
   a light shielding layer and/or a light shielding ring arranged on an inner side of a wall of the third hole structure,
   a second light shielding layer which is an annular light shielding layer, said second light shielding layer arranged on a surface of the second sheet body at a position corresponding to the first hole structure.

9. The mobile phone protection jacket according to claim 8, wherein the mobile phone protection jacket is formed with a profiled mounting hole into which the camera protection device is embedded.

10. The mobile phone protection jacket according to claim 8, wherein the first sheet body is made of lightproof material, and both the first hole structure and the second hole structure are a through hole.

11. The mobile phone protection jacket according to claim 8, wherein a fourth hole structure configured for cooperation with a noise-reducing microphone is arranged on the first sheet body and a fifth hole structure arranged at a position of the second sheet body corresponding to the fourth hole structure.

12. The mobile phone protection jacket according to claim 8, wherein the first sheet body is made of light transmitting material.

13. The mobile phone protection jacket according to claim 12, wherein the light shield comprises a third light shielding layer arranged on a wall of the first hole structure and/or the second hole structure.

14. The mobile phone protection jacket according to claim 12, wherein the light shield comprises a third light shielding ring embedded into the first hole structure and/or the second hole structure.

15. The mobile phone protection jacket according to claim 12, wherein the first sheet body is made of glass or polymethyl methacrylate (PMMA).

* * * * *